United States Patent Office 3,589,922
Patented June 29, 1971

3,589,922
METHODS FOR BLEACHING GRAY KAOLIN CLAY
Bernard K. Asdell, McIntyre, and Miller B. Mallary, Macon, Ga. assignors to Engelhard Minerals & Chemicals Corporation, Township of Woodbridge, N.J.
No Drawing. Filed Oct. 31, 1967, Ser. No. 679,556
Int. Cl. C09c 1/42
U.S. Cl. 106—288B          6 Claims

ABSTRACT OF THE DISCLOSURE

Gray kaolin clay from Georgia (so-called "hard" clay) is bleached by treatment of an aqueous slip of the clay at elevated temperature with a small amount of hydrogen peroxide at a pH below 3. The peroxide-treated slip is then treated with potassium permanganate and subsequently with a reducing agent such as a hydrosulfite salt. This type of clay may also be bleached with the hydrogen peroxide per se at the low pH and at the elevated temperature by using larger quantities of the reagent.

BACKGROUND OF THE INVENTION

Kaolin clay pigments having at least 90% G.E. brightness values are employed by the paper coating industry. These very bright clay products have heretofore been obtained by processing sedimentary Georgia kaolin crudes of the soft clay type. Kaolin clays from these soft crudes have a distinctive yellow-orange tinge and are beneficiated by wet-processing including degritting, fractionation, flotation and hydrosulfite bleaching. Soft crudes of the type which have heretofore been the source of 90% plus brightness kaolins are in dwindling supply.

Vast sedimentary deposits of hard kaolin clay crudes are also found in the United States. The clay in these deposits is extremely finely divided and is frequently of remarkably high purity. However, until recently these hard clays were not considered to be suitable sources of 90%-plus brightness pigment grades of kaolin because of the distinct gray color of the clay. Bleaching reagents that have been employed successfully with the soft clays are of little, if any, benefit when applied to the sedimentary Georgia gray kaolins. Surprisingly, the distinctive gray coloration of the hard clays is not attributable to organic matter per se. The iron content of these clays is high, however, and the difficulties encountered in attempts to brighten gray clays by chemical means is believed to result from the presence of at least some of this iron in a form that is not responsive to conventional clay bleaches.

Progress towards the utilization of the gray kaolins has been made by subjecting the clay to froth flotation in the presence of reagents selective to the flotation of some of the colored impurities in the clay (principally a yellowish titania mineral). The flotation process is described in U.S. 2,990,958 to Ernest W. Greene et al. After flotation of impurities, the purified clay is bleached chemically.

Further progress in the direction of bringing about the commercial exploitation of the hard clays for pigment use has been the discovery that hard Georgia kaolin clay responds well to bleaching by treating an aqueous pulp of the gray clay, preferably floated clay, with an oxidizing reagent and then a reducing agent. The preferred oxidizing agent is a permanganate salt, the residue of which is decolorized by the subsequent treatment with a reducing agent. Reference is made to a copending U.S. patent application, Ser. No. 330,634, filed Dec. 16, 1963 by James B. Duke, now U.S. Pat. No. 3,353,668. By using flotation in conjunction with the "oxidation-reduction" bleach, as described in said application, 90% plus brightness clays have been produced from 80% brightness gray clay crudes. These clays compare favorably in brightness to the best domestic and English coating clays and, moreover, have unusually high color purity, comparable to that of the best primary English clays. Of interest is the fact that the oxidation-reduction bleach is selective to hard clay since such bleach treatment is no more effective than a reducing bleach per se when applied to soft kaolin clays.

THE INVENTION

An object of this invention is to provide novel methods for bleaching hard kaolin clays.

Another object is to bring about improvements in a process for brightening hard kaolin clay with a combination of a permanganate salt and a reducing bleach.

A specific object is to reduce the cost of bleaching hard clay by treatment with a permanganate salt and a reducing bleach.

We have discovered that hydrogen peroxide is an effective bleaching agent for gray kaolin clay when employed in a specific manner described hereinafter and that notable reduction in bleaching costs may be realized when the peroxide is used in such manner as a preliminary to the treatment of gray clay with a permanganate salt and then a reducing agent.

We have also discovered that when the peroxide treatment is applied to a flotation beneficiated clay, we may avoid difficulties that normally arise in filtering flotation beneficiated gray clay as a result of a fine persistent froth normally produced when a pulp of floated clay is oxidized with a soluble permanganate salt.

Briefly stated, the invention in its broadest aspect entails the steps of mixing hydrogen peroxide into an aqueous pulp of gray (hard) kaolin clay, maintaining the pulp at a temperature above about 100° F., preferably about 110–190° F., and at a pH below 3 until oxidation of impurities in the clay takes place.

A preferred embodiment of the invention, which is applicable to the processing of floated and nonfloated gray kaolin clays, comprises the steps of incorporation of a small amount of hydrogen peroxide into an aqueous pulp of the gray clay, aging the mixture at a temperature above about 100° F. at a pH below 3, incorporating potassium permanganate into the pulp and aging the mixture until impurities in the clay are oxidized and some of the permanganate is reduced, and then treating the pulp with a strong reducing agent.

By practicing the preferred embodiment of the invention, gray kaolin can be bleached to optimum or near-optimum brightness values at a fraction of the reagent costs using permanganate and reducing bleach in the absence of the peroxide pretreatment or using the peroxide treatment per se.

Further, when the peroxide treatment is applied to floated gray clay, the bleached clay is easier to filter than floated clay would be if it were treated with permanganate and reducing bleach without the peroxide treatment.

Representative of the hard clays amenable to the bleach treatments of this invention are the sedimentary, hard kaolins from the Cretaceous kaolin belt in the southeastern portion of the United States. These crudes are characterized by a distinct gray color and by the extremely fine size of the ultimate clay particles. Thus, the average size of the particles in degritted hard crudes is in the submicron size range, typically 0.4–0.5 micron. Iron content is typically about 2%, expressed as $Fe_2O_3$, which is considerably higher than that of the white (soft) crudes.

As mentioned, the invention may be practiced with floated and non-floated gray kaolins. These may be whole clays, degritted clays or coarse or fine size fractions of the clays. When treating unfloated or floated clay it is preferable to employ a fine size fraction of degritted clay obtained by conventional techniques. The slip of dispersed, fine fractionated clay (typically 90% minus 2 microns) is flocced with an acid (preferably sulfuric acid or other strong non-oxidizable acid) to the desired pH, preferably about 2.0–2.5, and the flocced pulp is thickened to a solids content of about 10% to 25% by weight by decanting supernatant liquid. When treating flotation beneficiated clay, the machine discharge from the flotation cells is treated in similar manner to produce 10% to 20% solids slips having a pH of 3 or below. The clay slip is heated and hydrogen peroxide is incorporated as an aqueous solution of concentration suitable for handling, e.g., 1 to 50% concentration. Alternatively, the slip is heated after peroxide is added. We prefer to agitate the slip during the peroxide treatment while maintaining it at a temperature within the range of about 100–200° F. in order to prevent settling of the solids. Aging time at the elevated temperature may be as short as 15 minutes in some cases although we prefer to age for at least one hour. Prolonged aging is not detrimental and excellent results have been obtained with longer aging times such as 24 hours or even more. At relatively high temperatures, e.g., 180° F., the aging time may be somewhat less than when aging is at lower temperature, e.g., 140° F.

We prefer to carry out the peroxide reaction at a temperature below which the slip has appreciable vapor pressure and therefore prefer to operate below the boiling point unless closed equipment is available. On the other hand, when the temperature is too low, the results are not as good as when higher temperatures are employed.

Using acid-thickened clay slips, an adjustment of pH will not be necessary provided the slip has been flocced to a suitable pH. Sulfuric acid or other strong non-oxidizable acids are preferred for pH adjustment purposes when needed. The preferred pH of the slip during the hydrogen peroxide oxidation treatment is within the range of about 1.5 to 2.5. At a pH appreciably above 2.5, the peroxide is not nearly as effective as it would be at a lower pH value. At a pH appreciably below 1.5, undesirable leaching of the clay may take place.

The quantity of hydrogen peroxide that is used will vary with the specific crude being processed and with the desired brightness of the finished clay product. The quantity employed will also depend on whether the peroxide is to be used as the sole bleach or whether, as in the preferred embodiment of this invention, the peroxide is employed as a pretreatment before permanganate-reducing bleach processing. Using peroxide alone with floated clay, about 5 lb./ton $H_2O_2$ will produce notable brightening of a representative Georgia kaolin clay, although 10 to 25 lb./ton may be required to produce a 90%-plus brightness product. When employing the peroxide as a pretreatment, smaller quantities of the reagent suffice, and 90%-plus brightness products may be obtained from floated hard clay with from 1 to 5 lb./ton $H_2O_2$. With some crudes, however, it may be necessary to use 10 lb./ton $H_2O_2$ or more when employing peroxide as a pretreatment or 25 lb./ton of $H_2O_2$ or more when using peroxide as the sole bleach.

As mentioned, we prefer for economic reasons to treat the hard clay with the hydrogen peroxide and then process the clay by adding potassium permanganate or other soluble permanganate salt as a secondary oxidizing agent. The soluble permanganate salt is added to the peroxide-treated clay as an aqueous solution.

The potassium permanganate reaction may be carried out at ambient temperature or at elevated temperature. It is convenient to add the permanganate solution to the slip while the slip is still hot as a result of the peroxide treatment although the slip may be allowed to cool during permanganate treatment. When the permanganate is added, the slip is initially deep pink in color, this being characteristic of the color of permanganate ion. As the permanganate acts on the clay impurities, the solids in the slip acquire a tan-to-brown color. When present, unreacted permanganate will appear in the liquid phase as a pink coloration.

The quantity of permanganate salt that is employed will vary from crude to crude and depends upon the brightness specifications of the product. The amount, however, is substantially less than would be required in the absence of hydrogen peroxide treatment to obtain products of comparable brightness. In most cases, from 1 to 5 lb./ton of potassium permanganate will be sufficient to produce 90%-plus brightness products from crudes which would require about twice as much permanganate and twice as much reducing bleach in the absence of the hydrogen peroxide pretreatment.

It is essential in carrying out this invention to carry out the reaction of clay impurities with the peroxide before the permanganate is added. Otherwise the peroxide would react with the permanganate, deactivating both reagents. The redox reaction that would occur may be represented by the following equation $$2KMnO_4 + 5H_2O_2 + 3H_2SO_4 \rightarrow K_2SO_4 + 2MnSO_4 + 5O_2 + 8H_2O$$

The permanganate treatment usually requires about 1 to 24 hours, depending upon the particular clay and treating temperature. This treatment is also preferably carried out with an acid pulp, preferably a pulp having a pH within the range of about 2 to 3.

After the permanganate has acted on the impurities in the slip, the slip is treated with a reducing agent capable of reducing any manganese ions to colorless manganous (+2) ions. Hydrosulfite salts such as zinc hydrosulfite or sodium hydrosulfite are suitable. These salts are preferably used in an acid system in amount of 2 to 10 lb. hydrosulfite salt per ton of clay and may be employed at ambient temperature or at elevated temperature. Sulfur dioxide gas is also suitable and the reduction treatment may be carried out by bubbling the gas into the acidic permanganate-treated slip until the slip is decolorized. Combination of reducing bleaches are also within the scope of the invention. Thus, in some cases outstanding results may be realized by treating the slip with sulfur dioxide and thereafter adding the hydrosulfite bleach liquor. Oxalic acid is still another example of a suitable reducing agent for the reduction bleach treatment. Another material which acts as a reducing agent in the presence of acid and manganese ions of valence states above plus 2 is hydrogen peroxide. The use of hydrogen peroxide to reduce and decolorize a slip of permanganate treated hard clay is disclosed and claimed in a copending application of Miller B. Mallary, Ser. No. 621,453, filed Mar. 8, 1967.

Thus, it is within the scope of the present invention to bleach a slip of hard floated or unfloated clay by a sequence of steps including: hydrogen peroxide treatment, permanganate treatment and a second hydrogen peroxide treatment. When using hydrogen peroxide in the reducing bleach treatment, it may be necessary to add sulfuric or other mineral acid to the pulp since acid is consumed when the peroxide acts as a reducing agent and the pH may increase to levels at which the peroxide is no longer effective as a reducing agent. Such reaction is represented by the equation which appears above in connection with the discussion as to why it is essential to employ the primary hydrogen peroxide treatment before the permanganate is added to the clay pulp.

It is interesting to note that use of the strong reducing agent (as required to reduce the manganese ions to the +2 valence) also apparently acts on some of the oxidized colored impurities in the hard clay.

The following examples are given for illustrative purposes. In these examples, all percentages are reported on a weight basis and all reagent quantities refer to pounds of 100% active ingredient in the reagent per ton of bone dry clay. Clay brightness values refer to values obtained by TAPPI Standard Method T–646 m–54, described on pages 159A and 160A of the October 1954 issue of TAPPI, a publication of the Technical Association of the Pulp and Paper Industry.

The slip of flotation beneficiated hard kaolin clay employed in the illustrative examples was prepared as follows. Crude hard clay from the Prim property in Wilkinson County, Georgia, was pulverized to a maximum lump size of ½ inch. The pulverized, gray-colored clay was mixed with water at 28% solids in an intensive mechanical blunger at 31% solids. The blunged clay was deflocculated by adding 4 lb./ton of dry soda ash and 2.5 lb./ton of "O" brand sodium silicate (containing 38% solids). The slurry was degritted, centrifuged and a slip of fine size fraction clay was recovered. The fine size fraction contained about 95% by weight of particles finer than 2 microns equivalent spherical diameter. The slip of fractionated clay was diluted to about 20% solids and conditioned for the selective flotation of colored impurities (principally titaniferous minerals) with the following reagents:

|  | Lb./ton |
|---|---|
| Minus 325 mesh calcite | 400 |
| Ammonium sulfate (5% solution) | 6 |
| Tall oil | 6 |
| Lube oil | 8 |

The pulp was given one rougher flotation and the froth was cleaned three times. No. 2 fuel oil was added during the cleaner flotations.

The machine discharge from the flotation cells was flocculated by adding sulfuric acid to a pH of 2.5 and thickened to about 21% solids by decanting water from the flocculated pulp. The 21% solids pulp was used as the feed for the various bleaching tests. A sample of this product after being dried and pulverized for brightness testing had a G.E. brightness of 86.7%.

The nonfloated hard clay used in some of the examples was obtained from the same crude used to obtain the floated clay and by the same processing except that the centrifuge effluent containing the fine size fraction of clay was used without flotation. This effluent was flocced with sulfuric acid to a pH of 2.5 and thickened to 21% solids by decantation.

EXAMPLE I

Bleaching with hydrogen peroxide per se

Portions of the 21% solids slip of flotation beneficiated hard clay (pH of 2.5) were heated to 120° F. A 30% solution of hydrogen peroxide was added to each of the slips, varying the quantity of reagent in the slips from 5 to 30 lb./ton $H_2O_2$. The peroxide treated slips were maintained at 120° F. for two hours while the slips were agitated. The slips were separately filtered in Buchner funnels. It was observed that all of the slips filtered readily and were free from the small persistent bubbles present in permanganate-treated slips of the same floated clay. The residue on the filters was washed with water, dried, pulverized and tested for brightness. The results are summarized in Table I.

TABLE I

[Bleaching flotation beneficiated hard kaolin with hydrogen peroxide alone at 120° F. and 2.5 pH]

| Sample number | $H_2O_2$, pound/ton | G.E. brightness, percent |
|---|---|---|
| Control | None | 86.7 |
| 1 | 5 | 89.5 |
| 2 | 10 | 90.4 |
| 3 | 15 | 91.1 |
| 4 | 20 | 91.0 |
| 5 | 25 | 90.7 |
| 6 | 30 | 91.1 |

Data in Table I indicate that the beneficiated hard clay could be bleached to 90%-plus brightness values with 10 lb./ton or more hydrogen peroxide and that 91%-plus brightness required the use of 15 lb./ton or more of the peroxide.

To determine whether a reducing bleach would further improve the brightness of the peroxide bleached kaolin, a portion of the peroxide treated slip of Sample No. 3 was treated with various quantities of zinc hydrosulfite bleach liquor after the two hour treatment with peroxide at 120° F. No further improvement in brightness was noted.

EXAMPLE II (A) Bleaching flotation beneficiated hard kaolin with combination of $KMnO_4$ and $ZnS_2O_4$ without $H_2O_2$ pretreatment Samples of the 21% solids slurry of beneficiated hard clay (pH 2.5) were treated at 180° F. for 1 hour with various quantities of potassium permanganate added as a 1% solution. The slips were agitated during the treatment. To each of the permanganate treated slips, zinc hydrosulfite bleach liquor was added in amount to provide 15 lb./ton $ZnS_2O_4$. The treated products were filtered, washed, dried, pulverized and tested for brightness. It was found that optimum brightness (92.0%) was realized by using about 6 lb./ton $KMnO_4$ and 15 lb./ton $ZnS_2O_4$ and that there was no advantage in using appreciably more than 6 lb./ton of the permanganate. Tests were therefore made with other portions of the slip using 6 lb./ton $KMnO_4$ but with reduced amounts of zinc hydrosulfite reducing bleach. The results of the various tests are shown in Table II.

TABLE II

[Bleaching flotation beneficiated hard kaolin with $KMnO_4$ and $ZnS_2O_4$]

| Sample number | Pound/ton | | Brightness, percent |
|---|---|---|---|
| | $KMnO_4$ | $ZnS_2O_4$ | |
| 7 | 3 | 15 | 91.5 |
| 8 | 4 | 15 | 91.6 |
| 9 | 5 | 15 | 91.8 |
| 10 | 6 | 15 | 92.0 |
| 11 | 7 | 15 | 92.1 |
| 12 | 6 | 8 | 91.2 |
| 13 | 6 | 9 | 91.4 |
| 14 | 6 | 10 | 91.6 |
| 15 | 6 | 11 | 91.8 |
| 16 | 6 | 12 | 91.8 |

The results of the tests reported in Table II indicate that, when using the combination of potassium permanganate and zinc hydrosulfite bleach with the flotation beneficiated hard clay, minimal reagent quantities to obtain optimum or near optimum brightness were 6 lb./ton $KMnO_4$ permanganate and 11 lb./ton $ZnS_2O_4$.

(B) Bleaching flotation beneficiated hard kaolin with synergistic combinations of $H_2O_2$, $KMnO_4$ and $ZnS_2O_4$ In accordance with the present invention, portions of the 21% solids slip of floated kaolin were treated with 3 lb./ton $H_2O_2$ at 120° F. for two hours, as in Example I. This quantity of hydrogen peroxide was selected because it was the minimum to achieve appreciable froth reduction. The peroxide treated slips were then treated with potassium permanganate and then zinc hydrosulfite bleach liquor, as in Part A of this example. A smaller quantity (1-3 lb./ton) of potassium permanganate was used, however, and the quantity of zinc hydrosulfite was also reduced to levels well below the 11 lb./ton quantity which gave optimum results with 6 lb./ton potassium permanganate in the absence of peroxide pretreatment. The slips were filtered, washed, dried, pulverized and tested for brightness. The results appear in Table III.

TABLE III

[Bleaching flotation beneficiated hard kaolin with combinations of $H_2O_2$, $KMnO_4$ and $Zn_2O_4$]

| Sample Number | Pound/ton | | | Brightness, percent |
|---|---|---|---|---|
| | $H_2O_2$ | $KMnO_4$ | $ZnS_2O_4$ | |
| 17 | 3 | 3 | 4 | 91.7 |
| 18 | 3 | 3 | 5 | 92.1 |
| 19 | 3 | 3 | 6 | 91.3 |
| 20 | 3 | 3 | 7 | 92.1 |
| 21 | 3 | 3 | 8 | 91.6 |

A comparison of data in Table III for floated hard clay bleached with permanganate and hydrosulfite with a peroxide pretreatment and data in Table II for similar clay bleached with permanganate and hydrosulfite without peroxide treatment, indicate that products of generally comparable brightness were obtained with about half the quantities of permanganate and hydrosulfite when the floated clay was pretreated with 3 lb./ton $H_2O_2$.

At present reagent prices, the total reagent cost required to bleach the clay to 92% brightness, was reduced by 40% when the clay was pretreated with the 3 lb./ton $H_2O_2$.

EXAMPLE III

Bleaching nonfloated hard kaolin with combinations of $H_2O_2$, $KMnO_4$ and $ZnS_2O_4$ and with $H_2O_2$ alone Portions of the 21% solids slip of fractionated hard clay (2.5 pH) were heated to 180° F., hydrogen peroxide added and the slips maintained at 180° F. for one hour while being agitated. Some of the peroxide treated slips were treated with various quantities of potassium permanganate at 180° F. for one hour, as in Part B of Example II, and then with zinc hydrosulfite. Other portions of the 21% solids slip were treated with permanganate at 180° F. for one hour and then with zinc hydrosulfite without peroxide treatment, as in Part A of Example II. The results are summarized in Table IV.

TABLE IV

[Bleaching nonfloated hard kaolin with various reagents and reagent combinations]

| Sample number | Pound/ton | | | Brightness, percent |
|---|---|---|---|---|
| | $H_2O_2$ | $KMnO_4$ | $ZnS_2O_4$ | |
| Control | | | | 81.1 |
| 17 | 3 | | | 84.0 |
| 18 | 10 | | | 86.0 |
| 19 | 20 | | | 86.2 |
| 20 | | 7.5 | 12 | 86.5 |
| 21 | | 7.5 | 14 | 87.5 |
| 22 | | 7.5 | 16 | 87.7 |
| 23 | | 7.5 | 18 | 87.8 |
| 24 | 3 | 3 | 5 | 86.4 |
| 25 | 3 | 3 | 6 | 86.8 |
| 26 | 3 | 3 | 7 | 87.0 |

Data in Table IV show that the unfloated hard clay could be improved in brightness from 81.1% to 86.0% or more by use of at least 10 lb./ton $H_2O_2$ at elevated temperature and low pH. The data in the table show that the clay could be brightened to a level comparable to that obtained with 20 lb./ton $H_2O_2$ by using 7.5 lb./ton $KMnO_4$ and 12 lb./ton $ZnS_2O_4$. However, by pretreating the unfloated hard clay with only 3 lb./ton $H_2O_2$ at elevated temperature and low pH, the quantities of both the potassium permanganate and the zinc hydrosulfite could be reduced by 50% while still obtaining products of comparable brightness. This reduction of reagent quantity represents about a 40% overall reduction in reagent cost, including the cost of the peroxide pretreating reagent.

EXAMPLE IV

The following tests were carried out to illustrate certain critical features of the hydrogen peroxide treatment.

(A) The clay that was used was a sample of gray kaolin which had been beneficiated by froth flotation, flocculated with sulfuric acid to a pH of 2.5 and thickened to about 16% solids. Portions of the slip were heated to 120° F. and hydrogen peroxide added in increments of 5 lb./ton. The slips were maintained at 120° F. for two hours with agitation, filtered, washed and dried. It was found that the optimum brightness was achieved with 20 lb./ton hydrogen peroxide. The resulting product had a brightness of 91.0% as compared with a 86.2% brightness for the untreated clay.

To demonstrate the desirability of using a low pH during the peroxide treatment, portions of the 16% solids slip were treated with sodium hydroxide to increase pH to 3.0 and 3.5, and these slips were treated with 20 lb./ton $H_2O_2$ at 120° F. for two hours with mixing. pH was tested after hydrogen peroxide reactions and it was found that there was substantially no change in any case. All samples were filtered, washed, pulverized and tested for brightness with the results summarized in Table V. For the purpose of comparison, data for a slip that had been bleached with only 10 lb./ton hydrogen peroxide at 120° F. are also included.

TABLE V

[Effect of pH on bleaching hard kaolin with hydrogen peroxide (120° F.)]

| Sample number | pH | $H_2O_2$, pound/ton | Brightness, percent |
|---|---|---|---|
| 27 | 2.5 | 20 | 91.0 |
| 28 | 3.0 | 20 | 89.7 |
| 29 | 3.5 | 20 | 89.2 |
| 30 | 2.5 | 10 | 90.3 |

The data in Table V show that at a constant hydrogen peroxide level of 20 lb./ton, the effectiveness of the bleach improved as pH was reduced. In fact, 10 lb./ton hydrogen peroxide was much more effective when employed at a pH of 2.5 than twice that quantity when used at higher pH values.

(B) To demonstrate the desirability of employing elevated temperature during the peroxide treatment, portions of the 16% solids slip of Part A, of this example were treated with 20 lb./ton $H_2O_2$ at 70–75° F. for various periods of time while agitating the slips. The results are summarized in Table VI.

TABLE VI

[Effect of temperature on bleaching hard kaolin with hydrogen peroxide (pH 2.5)]

| Sample number | Temperature, ° F. | Time, hours | $H_2O_2$, pound/ton | Brightness, percent |
|---|---|---|---|---|
| 31 | 70–75 | 0 | 20 | 86.2 |
| 32 | 70–75 | 24 | 20 | 87.2 |
| 33 | 70–75 | 48 | 20 | 90.2 |
| 27 | 120 | 1 | 20 | 91.0 |

Data in Table VI show that the hydrogen peroxide treatment was much more effective when carried out for only one hour at 120° F. than when carried out for 48 hours at 70–75° F. Data for 24 hour treatment at 70–75° F. show that there was only a one point increase in brightness with 20 lb./ton $H_2O_2$ while the same quantity of peroxide brought about almost a five point increase in brightness when elevated temperature was used for only one hour. On this basis, the peroxide treatment was almost five times more effective when carried out for an hour at elevated temperature than it was when carried out for a day at ambient temperature.

We claim:
1. In a method for improving the brightness of gray kaolin clay which comprises subjecting a dispersed aqueous pulp of the clay to froth flotation in the presence of fatty acid reagent selective to the flotation of finely divided titaniferous impurities, thereby producing an aqueous concentrate of purified but discolored clay as a nonfloated portion, acidifying the aqueous concentrate of purified discolored clay, incorporating potassium permanganate, and incorporating a strong reducing agent, the improvement which comprises:
    incorporating hydrogen peroxide in said acidified aqueous concentrate of purified discolored clay and aging the mixture at a pH below 3 at a temperature above 100° F. until oxidation takes place, the amount of hydrogen peroxide being sufficient to reduce the quantity of said potassium permanganate and reducing agent required to brighten the clay and to break down fine stable foam in the concentrate of purified clay.

2. The method of claim 1 wherein said hydrogen peroxide is employed in amount within the range of 1 to 10 lb./ton of clay.

3. The method of claim 2 wherein said potassium permanganate is employed in amount within the range of 3 to 10 lb./ton of clay.

4. A method for brightening gray kaolin clay which comprises incorporating hydrogen peroxide into a slip of said clay and maintaining said slip at a pH below 3 at a temperature within the range of about 100° F. to 200° F. until oxidation takes place, thereafter incorporating potassium permanganate into said slip and aging said slip until further oxidation takes place, and while maintaining the permanganate-treated slip acidic, incorporating sufficient hydrogen peroxide to decolorize said slip, whereby the clay in said slip is increased substantially in brightness.

5. A method for improving the brightness of gray kaolin clay which comprises providing an aqueous pulp of the clay, acidifying the pulp to a pH below 3 with a nonoxidizable acid, incorporating hydrogen peroxide and maintaining the pulp at elevated temperature until oxidation of impurities in said clay takes place, adding a soluble permanganate salt to the clay pulp after the pulp is oxidized with said hydrogen peroxide and thereafter incorporating into the pulp a reagent capable of reducing and decolorizing said permanganate, 6. The method of claim 5 wherein said aqueous pulp of clay is the machine discharge of a flotation operation in which colored impurities are selectively floated from the clay.

References Cited

UNITED STATES PATENTS 3,353,668   11/1967   Duke _____ 106—72

OTHER REFERENCES

Kirk-Othmer, Encyclopedia of Chemical Technology, 2nd ed., vol. 11, 1963 (Sci. Lib. T.P.9 E.68), p. 396.

JAMES E. POER, Primary Examiner

U.S. Cl. X.R.
23—110; 106—72